United States Patent [19]
Akre

[11] 3,802,729
[45] Apr. 9, 1974

[54] PIT SCOOP

[76] Inventor: Albert Akre, 890 15th Ave., Granite Falls, Minn. 56241

[22] Filed: Mar. 1, 1971

[21] Appl. No.: 119,636

[52] U.S. Cl. .................................. 294/55, 15/257.4
[51] Int. Cl. .......................... A01b 1/02, A47l 13/52
[58] Field of Search ............... 294/55, 53.5, 51, 49; 15/257.1–257.8

[56] References Cited
UNITED STATES PATENTS

| | | | |
|---|---|---|---|
| 364,313 | 6/1887 | Skillin | 294/55 |
| 567,357 | 9/1896 | Parker | 15/257.4 |
| 677,950 | 7/1901 | Cutter | 15/257.4 |
| 2,899,699 | 8/1959 | Caisse | 15/257.4 |
| 304,362 | 9/1884 | Seavey | 294/55 |
| 774,944 | 11/1904 | Snedeker | 15/257.3 |
| 898,774 | 9/1908 | Niver | 15/257.7 |

Primary Examiner—Richard E. Aegerter
Assistant Examiner—Johnny D. Cherry
Attorney, Agent, or Firm—Albert Akre

[57] ABSTRACT

A shovel for use in a tightly confined space such as a car wash or service station sediment pit in which a free floating scoop is pivotally mounted to a handle at a point near its leading or scraping edge. The force applied to the handle and the angle of the handle relative to the scoop determine the depth of bite of the shovel while stops on the scoop keep the rear of the scoop from pivoting downward so that the sediment may be lifted vertically out of the pit.

1 Claim, 4 Drawing Figures

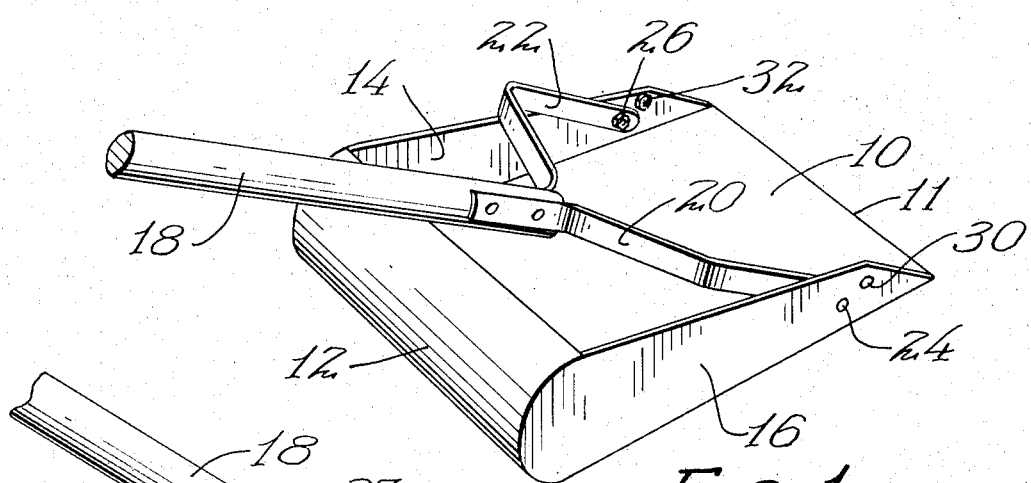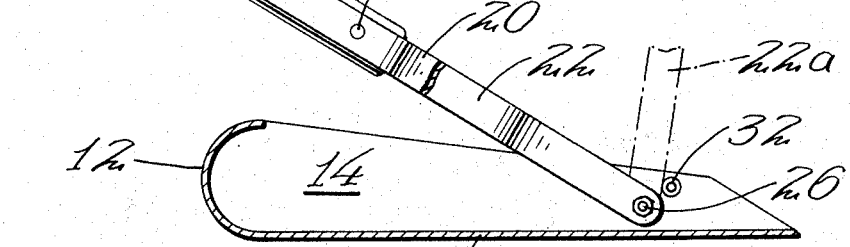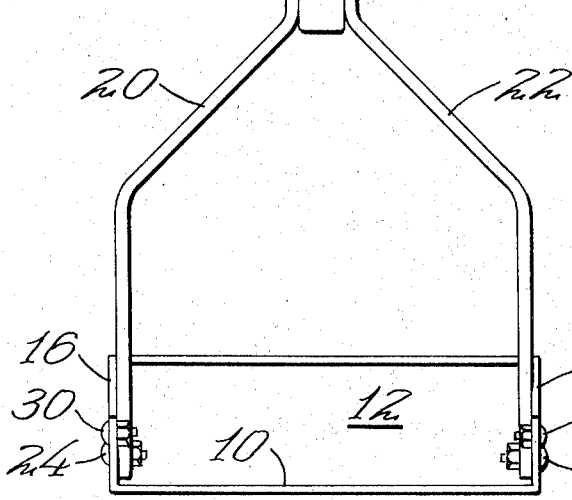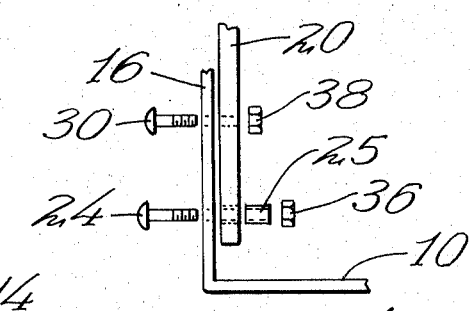

PIT SCOOP

BACKGROUND OF THE INVENTION

In the prior art there are shovels known in which the scoop portion is movable relative to the handle, but none of these prior art shovels are very suitable for use in a highly confined pit. The reason for this is that prior art shovels either pivot too freely so that the scoop portion is difficult to aim and control or else they are provided with latches at fixed locations so that the angle of the scoop is limited to one or two positions. As a result, in trying to clean deep and narrow sediment pits such as found in service stations or car washes a number of difficulties arise. If the shovel is allowed to pivot freely it is difficult to apply enough downward force on the leading edge to cleanly scrape the bottom of the pit. The shovel simply pivots away from the accumulated sediment. With a fixed position shovel the angle in which it is applied is so steep due to the narrowness of the pit that it will not slide along the bottom of the pit. A latched shovel also will not permit more than a small amount of sediment to be collected with each pass. In order to pick up more sediment it is better to have a scoop that is perpendicular to the handle so that it may be dropped downward into the narrow pit, scraped along the bottom surface, and retain more sediment due to its horizontal position. However, with the scoop portion perpendicular to the vertical handle it is difficult to apply any lateral force to the scoop so as to cause it to scrape along the pit bottom. One can simply not apply very much lateral force to a shovel at the bottom of a pit by moving the vertical handle sideways. In addition, handles which must be latched to a scoop in various positions are cumbersome and difficult to operate. The latches become clogged with dirt and engender bothersome maintenance chores which really should not be necessary with a tool such as a shovel. All of the above disadvantages are avoided by my invention as described below.

SUMMARY OF THE INVENTION

Briefly, the present invention contemplates a scoop which has a relatively flat bottom so as to conform readily to the bottom of the sediment pit. The rear portion of the scoop is larger and thus more heavy than the leading or scraping edge. As a result the rear portion of the scoop tends to drop slightly in fluid mediums giving the whole shovel a floating capability. The rear of the scoop is curved upward and around so as to form a sediment retaining hollow and since this end is carried somewhat lower by the handle when loading the sediment is easily gathered at the rear in large quantities. The handle is pivotally mounted to the scoop rather far forward toward the leading or scraping edge so as to allow an operator at the top of the pit to apply any combination of vertical and horizontal force to the leading or scraping edge. Since the rear portion of the shovel can float free the depth of the bite of the shovel is controlled by the pressure and angle on the handle.

When the shovel is full it may be lifted vertically out of the pit. The rear free floating portion of the shovel is permitted to drop only a little beyond the horizontal position. This restriction is effected by a pair of stops mounted to the side of the shovel which prevent the handle from pivoting too far forward with respect to the bottom surface of the scoop. It may therefore be seen that it is an object of the present invention to provide an improved pit scoop or sediment shovel. It is a further object of the present invention to provide a free floating scoop which can contain a large amount of sediment, be lifted vertically out of a narrow confined space, and in which the amount and depth of sediment scooped up by the leading edge is easily controllable by the handle. Further objects and advantages will become apparent upon consideration of the following description and drawings.

BRIEF DESCRIPTION OF THE DRAWINGS

FIG. 1 is a perspective view of the shovel of the present invention.

FIG. 2 is a sectional side view of the shovel showing the limit to which the handle can be raised by means of dashed lines.

FIG. 3 is a front elevational view of the shovel of the present invention.

FIG. 4 is a detailed view of the mounting pivot pins and the nut and bolt inserted through the side of the scoop to form stops on the handle.

DESCRIPTION OF THE PREFERRED EMBODIMENT

Referring simultaneously to FIGS. 1, 2 and 3 it may be seen that the present invention comprises a scoop portion having a relatively flat bottom 10, a leading or scraping edge 11, a pair of tapered side portions 14 and 16 and a rear curved retaining portion 12 which curves back around toward the front of the scoop so as to contain a large amount of sediment. A handle 18 is connected to a pair of members 20 and 22 by a pair of mounting bolts 27 and 29. Members 20 and 22 extend down to side portions 14 and 16 where they pivot on a pair of pivot bolts 24 and 26. In FIG. 2 it may be seen that handle 18 is free to pivot around bolts 24 and 26 and may be positioned at nearly any angle to bottom 10. However, as handle 18 is lifted, so as to bring the shovel out of a narrow pit, the scoop portion rotates downward until members 20 and 22 reach the position shown by dashed line 22a in FIG. 2. Here members 20 and 22 come to rest against a pair of nut and bolt combination stops 30 and 32 which are mounted in side portions 14 and 16 to serve as stops for the handle.

Referring briefly to FIG. 4 the exact configuration of the pivot bolt 24 and the stop 30 are shown. Pivot bolt 24 is inserted through side retaining portions 16 and into a bearing 25 which rides inside handle member 20. Bolt 24 is secured by a nut 36. The handle stop is formed simply by inserting bolt 30 through the side retaining portion 16 and affixing thereto a nut 38 which serves as a bearing surface against which the handle may rest. As can be seen in FIG. 2 the position of stops 30 and 32 are chosen to be just above and just forward of the pivot bolts so as to permit the bottom of the shovel 10 to slant somewhat downwards when the handle is vertical but only enough to retain the scoop of sediment near the rear curved portion of the scoop.

In operation, the shovel of the present invention has many advantages. Since side portions 14 and 16 taper upward to meet the higher rear curved portion 12 the rear portion of the scoop is heavier than the front of the scoop. Thus the rear of the shovel tends to sink somewhat in the semi-fluid medium and the scoop floats to a degree. By pivoting the handle to the optimum angle, the scoop can be slid along the floor of the sediment pit in this free floating condition. If an obstacle is encountered which cannot be overcome the front edge 11 of the shovel can be lifted by merely lifting handle 18 vertically. It is not necessary to lift the entire scoop full of sediment clear of the obstacle but only front edge 11 need be lifted so as to provide a sufficient amount of clearance. On the other hand if it is desired that front edge 11 scrape deeper so as to take more sediment a downward force may be applied. As a consequence of the free floating action of the shovel and the forward pivot points the front edge 11 alone can be caused to dig deeper into the sediment. As the scoop is pushed away by the man holding the handle the handle conveniently pivots downward always allowing a smooth even pressure to be applied to the leading edge 11. With the present invention the rear sediment containing portion of the shovel simply follows along, floating after scraping edge 11 which is guided easily by varying the pressure and angle of handle 18.

To lift the shovel up the operator need only pull upwards on handle 18. Because of the forward location of the pivot points the front leading edge of the shovel lifts first insuring that the sediment remains in the rear curved portion 12. However, the shovel is stopped from going too far beyond the horizontal by stops 30 and 32. Thus, the shovel can be lifted straight out of a very narrow pit with complete assurance that the sediment scooped up will remain in the rear portion of the scoop.

I claim:

1. A shovel for cleaning pits comprising, in combination:

a scoop body having a flat bottom including a thin front edge, a pair of retaining side walls secured to and extending upwardly from opposite sides of said flat bottom, a rear retaining wall connected to the rear of said bottom and curving upwardly therefrom along the rear edges of said side walls, a handle, bracket means secured to one end of said handle to form a bifurcated end on said handle, pivot means securing said bracket means to the inner surfaces of said side walls near the forward ends thereof, whereby the major part of the scoop body and contents will lie rearwardly of said pivot means, stops on said side walls engageable with said bracket means, said stops being between said brackets and the forward end of said bottom and limiting the pivotal movement between said scoop body and said handle to one extreme position where said handle and bottom are at slightly more than ninety degrees relative to one another, said brackets engaging said rear wall in another relative position of said scoop body and handle to form a second extreme position, whereby the weight of said scoop and the contents thereof causes free floating of said body when resting upon the contents of a pit to be cleaned, and when lifted said brackets will swing into engagement with said stops.

* * * * *